(12) United States Patent
Soltis et al.

(10) Patent No.: US 7,246,221 B1
(45) Date of Patent: Jul. 17, 2007

(54) BOOT DISK REPLICATION FOR NETWORK BOOTING OF REMOTE SERVERS

(75) Inventors: Edward Alan Soltis, Elk River, MN (US); Charles Steven Rissmeyer, Coon Rapids, MN (US)

(73) Assignee: Cisco Technology, Inc., San Jose, CA (US)

( * ) Notice: Subject to any disclaimer, the term of this patent is extended or adjusted under 35 U.S.C. 154(b) by 453 days.

(21) Appl. No.: 10/403,227

(22) Filed: Mar. 26, 2003

(51) Int. Cl.
*G06F 9/24* (2006.01)
*G06F 9/00* (2006.01)
*G06F 15/177* (2006.01)
*G06F 15/16* (2006.01)

(52) U.S. Cl. .............. 713/1; 713/2; 713/100; 709/219

(58) Field of Classification Search .......... 713/1, 713/2, 100
See application file for complete search history.

(56) References Cited

U.S. PATENT DOCUMENTS

| | | | | |
|---|---|---|---|---|
| 5,257,377 A | * | 10/1993 | Sathi et al. ............ | 717/170 |
| 6,098,098 A | * | 8/2000 | Sandahl et al. .......... | 709/221 |
| 6,917,958 B1 | * | 7/2005 | Howe et al. ............ | 709/203 |
| 7,055,026 B2 | * | 5/2006 | Gere ..................... | 713/100 |
| 2002/0165945 A1 | * | 11/2002 | Buswell et al. ........ | 709/221 |
| 2003/0126242 A1 | * | 7/2003 | Chang ................... | 709/222 |
| 2004/0034671 A1 | * | 2/2004 | Kodama ................ | 707/204 |

OTHER PUBLICATIONS

Mark Russinovich, "NT Rollout Options", Jun. 1998, Windows IT Pro.*

* cited by examiner

*Primary Examiner*—Thomas Lee
*Assistant Examiner*—J H. Bae
(74) *Attorney, Agent, or Firm*—Schwegman, Lundberg, Woessner & Kluth P.A.

(57) ABSTRACT

In one embodiment, a method includes replicating data in a storage disk. The method also includes storing the data in an Internet Protocol Small Computer System Interface (iSCSI) boot disk that is associated with a diskless iSCSI server. A part of the data, which is related to a device on which the data is executed, is updated during the storing of the data in the iSCSI boot disk.

40 Claims, 3 Drawing Sheets

BOOT DISK REPLICATION FOR NETWORK BOOTING OF REMOTE SERVERS

FIELD OF THE INVENTION

The invention generally relates to booting computers, and more specifically to a system and method for boot disk replication for network booting.

BACKGROUND OF THE INVENTION

There are various network configurations for devices/computers coupled together in a network. One example is the client-server configuration, wherein a number of servers and a number of clients are coupled together, such that the clients typically utilize the servers for storage and retrieval of data there from.

Furthermore, in order to ensure better performance and fault tolerance, servers typically store data in a Redundant Array Independent Disk (RAID) configuration, wherein the same files or data are stored in different locations (e.g., a different drive on a same server (internal RAID configuration) or a different drive on a different server (external RAID configuration)). An internal RAID configuration is subject to lower reliability, because if the server on which the data is redundantly stored in inoperative, the data cannot be accessed from the primary storage or the secondary storage. In contrast, an external RAID configuration provides greater reliability because the data is not redundantly stored on one server. Therefore, if the server providing the primary storage for the data is inoperative, the data may still be accessed from the server providing the secondary storage for the data.

Moreover, the distribution of the different components of a server is now distributed across the network. For example, in one configuration, a storage disk for a server is at a different location as compared to the location of the processor/memory/monitor of the diskless part of the server. One type of protocol to allow communication between a storage disk and a diskless server is the Internet Protocol Small Computer System Interface (iSCSI) protocol. The iSCSI protocol allows for the transmission of data across a network using SCSI commands over IP-based networks. Accordingly, the iSCSI protocol can be employed for such boot operations to enable the downloading of the operating system from the storage disk into the memory of the diskless server.

Additionally, an administrator will need to install the boot drivers, operating system, applications, etc. in the storage disks of the different servers during initialization. Such installations across the different devices of the network can be time consuming and problematic as parameters for the different devices are unique. These installations may be particularly time consuming and problematic for configurations having a number of servers, such as the external RAI configurations. Therefore, the administrator is required to install these boot drivers, operating system, applications, etc. based on the unique parameters for the given server.

SUMMARY OF THE INVENTION

In one embodiment, a method includes replicating data in a storage disk. The method also includes storing the data in an Internet Protocol Small Computer System Interface (iSCSI) boot disk that is associated with a diskless iSCSI server. A part of the data, which is related to a device on which the data is executed, is updated during the storing of the data in the iSCSI boot disk.

In an embodiment, a method includes replicating files stored in a disk of a server, wherein the files have Security Identifiers (SIDs). The method also includes modifying values of the SIDs that are specific to the server. Furthermore, the method includes loading at least one registry file of the files from the disk into a memory of the server. Additionally, the method includes changing, in the at least one registry file, values of variables for an Internet Protocol (IP) address and a name for the server to values of an IP address and a name for the diskless Internet Protocol Small Computer System Interface (iSCSI) server that is use an iSCSI boot disk during boot operations, respectively. In one embodiment, at least a part of the Security Identifier (SID) values in the registry files are also changed. The method also includes storing the files in the iSCSI boot disk.

In one embodiment, a method includes copying files stored in a storage disk of a server to a number of boot disks that are used to boot a number of diskless servers. The method also includes performing a loading operation, a modifying operation and a copying operation for each of the number of boot disks. The loading operation includes loading a registry from the boot disk into a memory of the server. The modifying operation includes modifying at least one system parameter, which is specific to a device which uses the registry during execution, within the registry loaded into the memory. The copying operation includes copying the modified registry to the boot disk.

In an embodiment, an apparatus includes a storage disk operable to store a number of files including at least one registry file. The apparatus also includes a replication logic operable to replicate the number of files in the storage disk. The replication logic is also to store the replicated number of files within an Internet Protocol Small Computer System Interface (iSCSI) boot disk that is associated with a diskless iSCSI server. The replication logic is to change system parameters, which are stored in the at least one registry file and are specific to the apparatus, to values specific to the diskless iSCSI server.

In one embodiment, a system includes a storage disk operable to store a number of files include a registry to store parameters for the system. The system also includes a memory operable to store a copy of the registry. Additionally, the system includes a processor operable to execute a replication logic. The replication logic is to replicate the number of files in the storage disk. The replication logic is also to store the files in an Internet Protocol Small Computer System Interface (iSCSI) boot disk that is associated with a diskless iSCSI server, wherein at least one parameter, which is specific to a device which utilizes the registry during execution, is updated during the storage operation of the files in the iSCSI boot disk.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Figure 1:
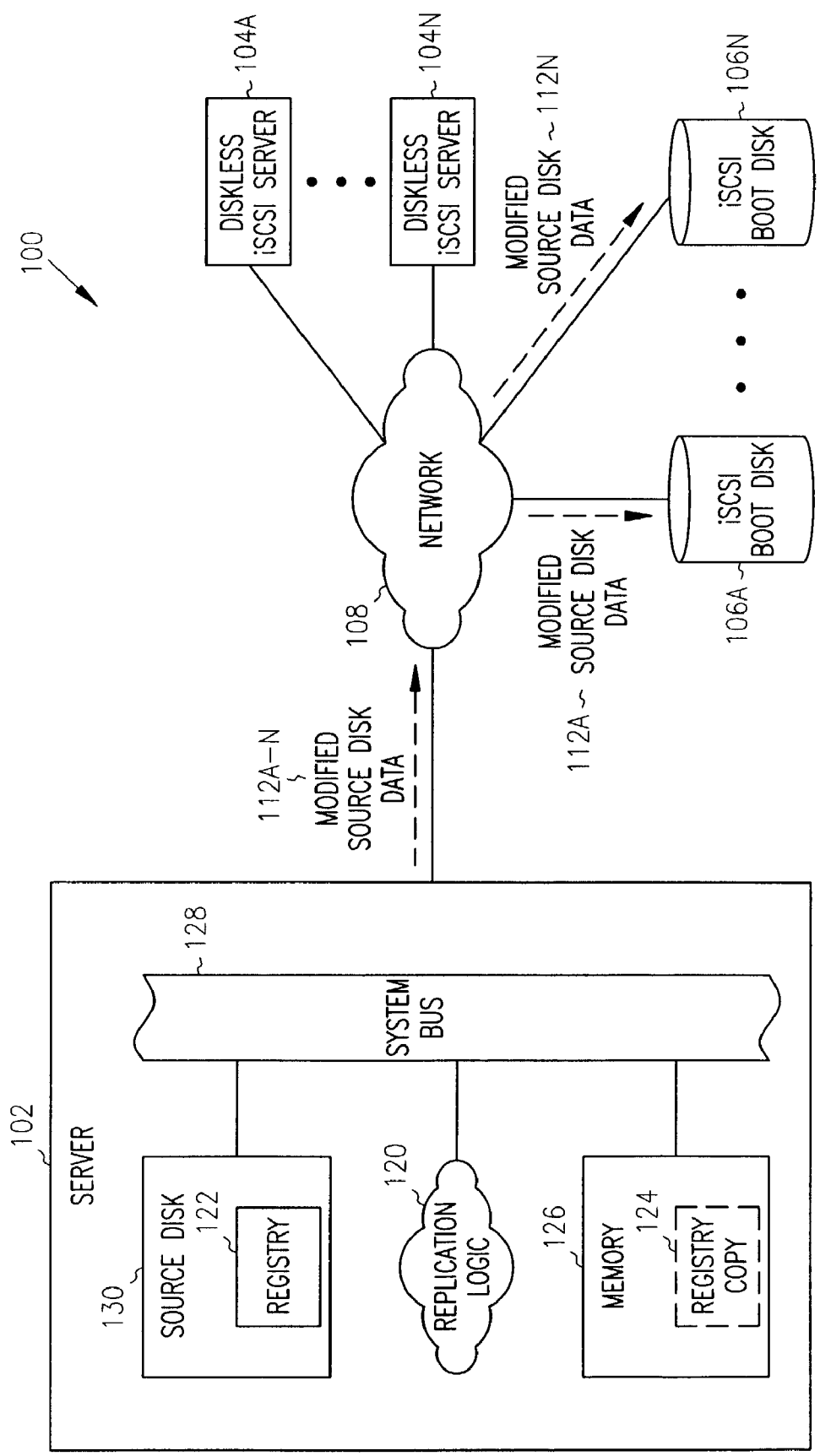
FIG. 1 illustrates a block diagram of a system that allows for boot disk replication for network booting of remote servers, according to one embodiment of the invention.

A method, apparatus and system for different embodiments for boot disk replication for network booting of remote servers are described. While embodiments of the invention are described such that the iSCSI protocol is employed for communications among the different network elements (such as between a boot disk and the associated diskless server), in other embodiments, other types of communications can be utilized for such communications. Moreover, although embodiments of the invention are described in reference to replication of a boot disk for a diskless server, embodiments of the invention can also be incorporated into replication of storage disks internal to the servers.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality with undue experimentation.

References in the specification to "one embodiment", "an embodiment", "an example embodiment", etc., indicate that the embodiment described may includes a particular feature, structure, or characteristic, but every embodiment may not necessarily include the particular feature, structure, or characteristic. Moreover, such phrases are not necessarily referring to the dame embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for boot disk replication for network booting of remote servers, in accordance with embodiments of the invention. A number of figures show flow diagrams illustrating operations for boot disk replication for network booting of remote servers. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 illustrates a block diagram of a system that allows for boot disk replication for network booting of remote servers, according to one embodiment of the invention. FIG. 1 illustrates a system 100 that includes a server 102, a number of diskless iSCSI servers 104A–104N, a number of iSCSI boot disks 106A–106N, which are coupled together through a network 108. The server 102 includes a source disk 130, a replication logic 120 and a memory 126, which are coupled together through a system bus 128. The source disk 130 stores a registry 122. Moreover, as will be described in more detail below, the replication logic 120 stores a copy of at least one of the files of the registry 122 (a registry copy 124) into the memory 126.

In one embodiment, the registry 122 is database for storage of a number of different system values for the server 102. Examples of the type of system values include the Internet Protocol (IP) addresses of the network interfaces (logical and/or physical) of the server 102, subnet masks for such IP addresses, the gateway for the server 102 out to the network 108, names/addresses of servers to which the server 102 communicates (e.g., a Domain Name Service (DNS) server), security identifiers (SIDs), etc.

At least one of the iSCSI boot disks 106A–106N is a boot disk for the diskless iSCSI servers 104A–104N. For example, in one embodiment, the iSCSI boot disk 106A is a secondary storage disk for the diskless iSCSI server 104A. Accordingly, the iSCSI boot disk 106A stores data that includes the data for booting the diskless iSCSI server 104A as well as the operating system for the diskless iSCSI server 104A.

Moreover, as will be described in more detail below, the replication logic 120 copies the data from the source disk 130 for the server 102 and modifies this data for each of the number of iSCSI boot disks 106A–106N to which the data is to be copied. The replication logic 120 transmits the different modified source disk data 112A–112N to the iSCSI boot disks 106A–106N, respectively.

As will be further described below, the replication logic 120 modifies the data on the source disk 130 that is specific/related to the server/device on which the data on the source disk 130 will be executing. In one embodiment, the modified data includes the IP address for the device. In another embodiment, the modified data includes the computer name for the device. In an embodiment, the modified data includes the SIDs that is specific to the device. For example, assume that the iSCSI boot disk serves as a boot disk for the diskless iSCSI server 104A. Accordingly, for the modified source disk data 112A to be stored in the iSCSI boot disk 106, the replication logic 102 modifies certain data that is specific to the diskless iSCSI server 104A (e.g., the IP address and computer name for the diskless iSCSI server 104A. Although the various devices shown in FIG. 1 are identified using various names, the various computerized systems and servers may take any form, including routers, networked appliances, set top boxes, telecommunications equipments (e.g., switches) or any other form consistent with embodiments of the invention as claimed in the appended claims.

Figure 2:
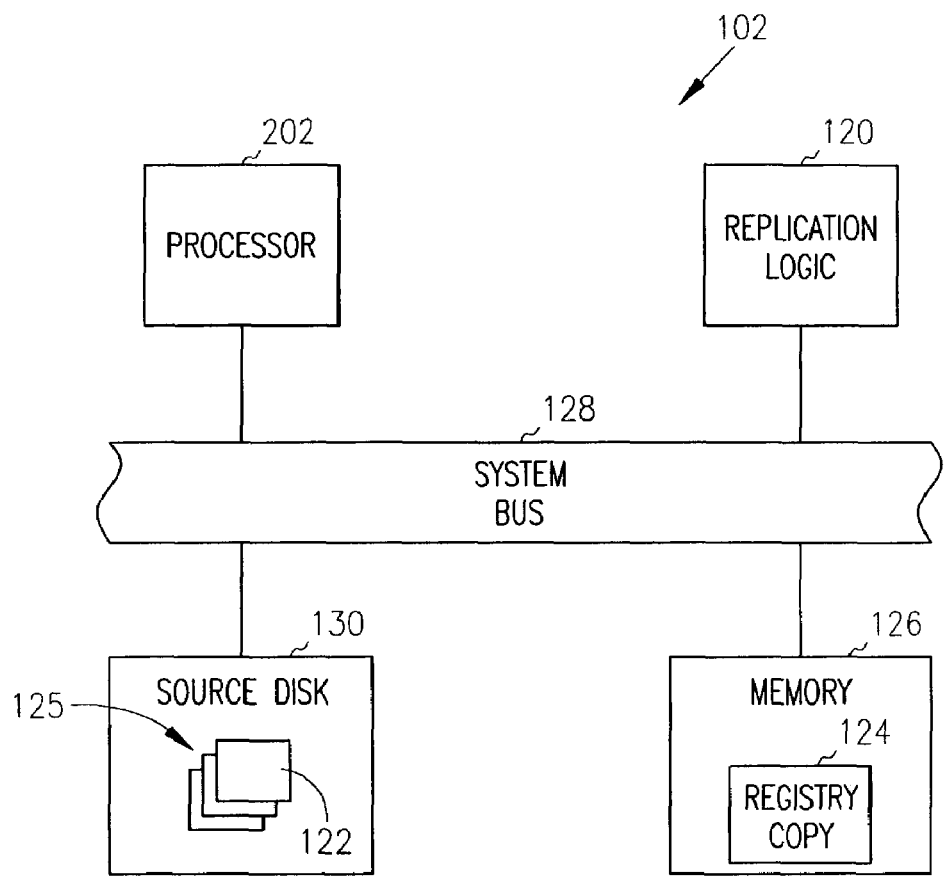
FIG. 2 illustrates a more detailed block diagram of a server for boot replication, according to one embodiment of the invention.

A more detailed block diagram of one embodiment of the server 102 will now be described. FIG. 2 illustrates a more detailed block diagram of a server for boot replication, according to one embodiment of the invention. In particular, FIG. 2 illustrates one embodiment of the server 102 that includes a processor 202, the replication logic 120, the source disk 130 and the memory 126, which are coupled together through the system bus 128. As shown, the source disk 130 stores a number of files 125 that include the registry 122. In one embodiment, the memory 126 is a random access memory. As described above, the memory 126 stores a copy of the registry 122 (the registry copy 124) that will include the modified system parameters within the registry copy 124 that are specific to the server/device in which the registry 122 is to be executed.

In one embodiment, the replication logic 120 may be a process or task that can reside within the memory 126 and/or the processor 202 and can be executed within the processor 202. However, embodiments of the invention are not so limited, as the replication logic 120 may be different types of hardware (such as digital logic) executing the operations described therein (which is described in more detail below).

Figure 3:
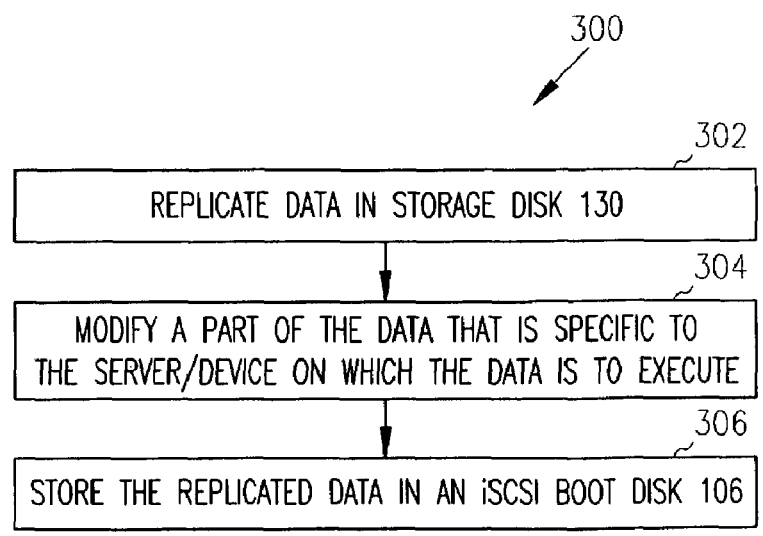
FIG. 3 illustrates a flow diagram for boot disk replication for network booting of remote servers, according to one embodiment of the invention.

The operations of the system 100 will now be described. FIG. 3 illustrates a flow diagram for boot disk replication for network booting of remote servers, according to one embodiment of the invention.

In block 302 of the flow diagram 300, data in the storage disk 130 is replicated. With reference to the system 100, the replication logic 120 replicates the data in the storage disk 130. In an embodiment, the replication logic 120 replicates the files stored in the storage disk 130. A more detailed description of this replication is described below in conjunction with the flow diagram 400 of FIG. 4. Control continues at block 304.

In block 304, a part of the replicated data specific to the device on which the data is to execute is modified. With reference to the system 100, the replication logic 120 modifies a part of the data that is specific to the device on which the data is to execute. As will be further described below, in an embodiment, the part of the replicated data that is specific to the device on which the data is to execute includes the registry 122, which includes system parameters, such as the IP address and the name of the machine as well as the SIDs specific to the machine, that are to be modified. In an embodiment, the part of the replicated data that is specific to the server/device on which the data is to execute includes the SIDs that are associated with each of the files and are specific to the machine on which the data executes. Moreover, as described below, such data is stored in one of the iSCSI boot disks 106 with the data being specific to the diskless iSCSI server 104 that is to utilize this iSCSI boot disk 106 for booting and for retrieval of an operating system for execution. Control continues at block 306.

In block 306, the replicated data (including the part that is modified) is stored in an iSCSI boot disk 106. With reference to the system 100, the replication logic 120 stores the replicated data (including the part that is modified) in the iSCSI boot disk 106 that serves as the boot disk for the diskless iSCSI server 104 for which the part of the replicated data that is modified is specific to. As will be further described below, in an embodiment, the replication logic 120 stores the replicated data in an iSCSI boot disk 106 through a number of copy/transfer operations. The operations of the flow diagram 300 are complete.

Figure 4:
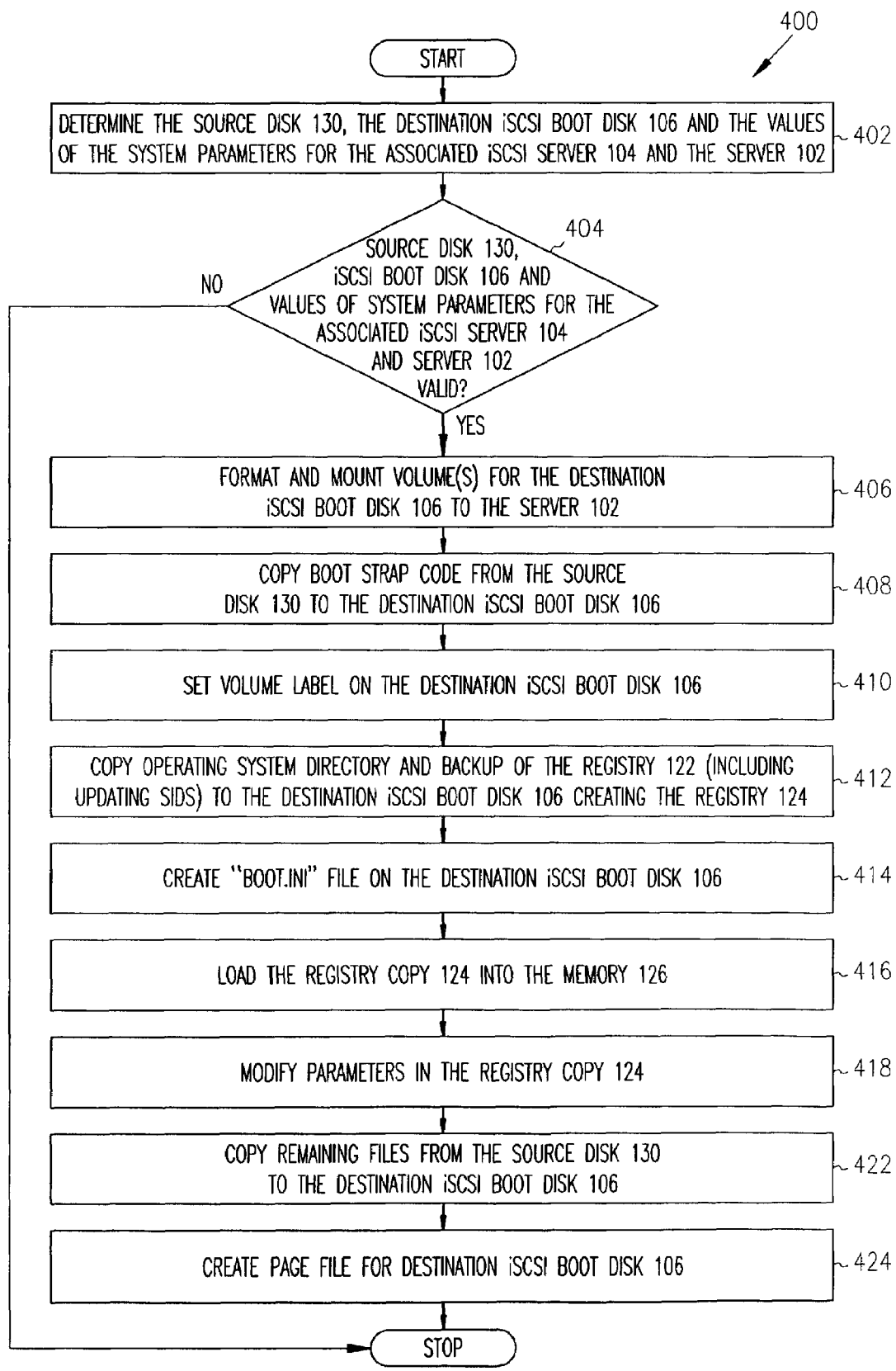
FIG. 4 illustrates a more detailed flow diagram for boot disk replication for network booting of remote servers, according to one embodiment of the invention.

A more detailed description of the operations for boot disk replication for network booting of remote servers will now be described. FIG. 4 illustrates a more detailed flow diagram for boot disk replication for network booting of remote servers, according to one embodiment of the invention.

In block 402 of the flow diagram 402, the source disk 130, the destination iSCSI boot disk 106 and the values of the system parameters for the associated diskless iSCSI server 104 and the server 102 are determined. With reference to the system 100, the replication logic 120 determines the identification of the source disk 130, the destination iSCSI boot disk 106 and the values of the system parameters for the associated diskless iSCSI server 104 and the server 102. In one embodiment, the source disk 130, the destination iSCSI boot disk 106 and/or the value of the system parameters for the associated diskless iSCSI server 104 and the server 102 are determined based on user input. For example, an administrator could use a graphical user interface (GUI) to enter these data. In one embodiment, the values of the system parameters for the associated diskless iSCSI server 104 are determined based on a retrieval of these values from a Dynamic Host Configuration Protocol (DHCP) server. A more detailed description of this retrieval is described in more detail in U.S. patent application entitled "Boot Time Modification of Registry Data for iSCSI Network Boot Operations", Ser. No. 10/395,927, filed Mar. 24, 2003, to Edward A. Soltis and Charles Stevens Rissmeyer.

As described above, one of the diskless iSCSI servers 104A–104N is associated with at least one of the destination iSCSI boot disks 106A–106N. Accordingly, in addition to determining the destination iSCSI boot disk 106 for the current operation of the flow diagram 400, the associated diskless iSCSI server 104 is also determined. Moreover, the replication logic 120 determines the values of the system parameters for the associated diskless iSCSI server 104, which (as described above) can include the IP address and computer name for the associated diskless iSCSI server 104.

Furthermore, while the system 100 illustrates the source disk 130 being within a same server 102 as the replication logic 120, embodiments of the invention are not so limited. Moreover, while the system 100 illustrates one source disk 130 from which data is copied, in other embodiments, the system 100 can include multiple source disks 130 in a different locations from which the data is copied. Accordingly, while the system 100 illustrates a single source disk 130, in other embodiments wherein there are multiple source disks 130, the source disk 130 for the current operations of the flow diagram 400 is to be determined. Moreover, as will be further described below, the data from the source disk 130 may be copied to multiple destination disks 106. Control continues at block 404.

In block 404, a determination is made of whether the source disk 130, the destination iSCSI boot disk 106 and the values of the system parameters for the associated diskless iSCSI server client 104 and the server 102 are valid. With reference to the system 100, the replication logic 120 determines whether the source disk 130, the destination iSCSI boot disk 106 and the values of the system parameters for the associated diskless iSCSI server 104 and the server 102 are valid. In one embodiment, the replication logic 120 determines that the selected source disk 130 is valid by determining if the selected source disk 130 is bootable. For example, the replication logic 120 determines if the selected source disk 130 includes the boot drivers and operating system from which a device can boot and execute. In an embodiment, the replication logic 120 determines that the selected destination iSCSI boot disk 106 is bootable based on a bootable partition flag being set for the desired boot partition in the Master Boot Record (MBR) of the selected destination iSCSI boot disk 106.

With regard to determining the validity of the values of the system parameters for the server 102, the replication logic 120 determines whether the values received equal the values of these system parameters (IP address, computer name, etc.). stored in the registry 122 of the server 102. With regard to determining the validity of the values of the system parameters for the diskless iSCSI server 104, the replication logic 120 determines whether the values received are different from the values of these same system parameters for the server 102. In other words, the replication logic 120 ensures that the values of the system parameters are not the same for the server 102 and the associated diskless iSCSI server 104. Upon determining that the source disk 130, the destination iSCSI boot disk 106 and/or the values of the system parameters for the associated diskless iSCSI server 104 and/or the server 102 are not valid, the operations of the flow diagram 400 are complete.

In block 406, upon determining that the source disk 130, the destination iSCSI boot disk 106 and the values of the system parameters for the associated diskless iSCSI server 104 and the server 102 are valid, the volume(s) of destination source disk 106 are formatted and mounted to the server 102. With reference to the system 100, the replication logic 120 formats and mounts the volume(s) for the destination iSCSI boot disk 106 to the server 102. Mounting the volumes for the destination source disk 106 to the server 102 enables the server 102 to access the destination source disk 106 as if the destination source disk 106 is a local drive (such as the source disk 130, a Compact Disk drive, etc.) of the server 102. In one embodiment, the replication logic 120 attaches the destination source disk 106 using iSCSI communications. Control continues at block 408.

In block 408, the boot strap code from the source disk 130 is copied to the destination iSCSI boot disk 106. With reference to the system 100, the replication logic 120 copies the boot strap code from the source disk 130 to the destination iSCSI boot disk 106. The boot strap code is data stored at a predetermined location on a storage boot disk. For example, for a given volume on a boot disk that is executing a Windows-based operating system, the boot strap code is the first 0x1b8 bytes of the disk. Moreover, in a Windows-based operating system, when a volume is configured on a boot disk, the boot strap code is not generated. Accordingly, the replication logic 120 copies the boot strap code from the source disk 130 to the predetermined location for storage of this code on the destination iSCSI boot disk 106. Control continues at block 410.

In block 410, the volume label on the destination iSCSI boot disk 106 is set. With reference to the system 100, the replication logic 120 sets the volume label on the destination iSCSI boot disk 106. The volume label is a configurable value that is ASCII text that identifies the volume on the destination iSCSI boot disk 106 on which the data from the source disk 130 is copied. Control continues at block 412.

In block 412, the operating system directory and the backup of the registry 122 are copied to the destination iSCSI boot disk 106, thereby creating the registry copy 124 on the destination iSCSI boot disk 106. Additionally, the SIDs specific to the server 102 and that are associated with the files in the operating system directory and the backup of the registry 122 are updated. With reference to the system 100, the replication logic 120 copies the operating system directory and the backup of the registry 122 to the destination iSCSI boot disk 106. Additionally, the replication logic 120 updates the SIDs specific to the server 102 and that are associated with the files in the operating system directory and the backup of the registry 122. For example, for a Windows-based operating system, the operating systems directory is the WINNT directory. Accordingly, the replication logic 120 copies the WINNT directory (including the files and subdirectories underneath) to the destination iSCSI boot disk 106.

With regard to the registry 122, when the server 102 is running, the files containing the registry 122 are open and the protections on these files are such that copies of the registry 122 cannot be made. A backup of the registry 122 (creating files that are not open) is maintained within the server 102. Therefore, the replication logic 120 copies the backup of the registry 122 to the destination iSCSI boot disk 106 as the registry copy 124. In an embodiment, instead of copying the files from the source disk 130, the replication logic 120 copies from one iSCSI boot disk 106 to a different iSCSI boot disk 106. For example, assume that the replication logic 120 has already copied the files from the source disk 130 to the iSCSI boot disk 106A. Accordingly, when files are to be copied to the iSCSI boot disk 106B, the replication logic 120 could copy the files from iSCSI boot disk 106A to iSCSI boot disk 106B (instead of from the source disk 130). If the associated diskless iSCSI server 104 for the iSCSI boot disk 106A is not executing, then the files containing the registry 122 within the iSCSI boot disk 106A will not be open. Therefore, the replication logic 120 can copy the registry 122 instead of a copy of the backup of the registry 122.

With regard to the updating of a number of the SIDs that are associated with the files in the operating systems directory and the registry 122, SIDs are security identifiers that identify the SID-issuing authority (e.g., Windows 2000), the SID-issuing domain (the domain identifier) and a given security group (the relative identifier). Accordingly, for the SIDs that are specific to the server 120 (based on the values of the domain identifier and/or the relative identifier), the replication logic 120 changes the relative identifier portion of the SID. In one embodiment, the replication logic 120 generates a random number to replace the relative identifier portion of the SID that is specific to the server 102. For example, if the SID for a given file is "S-1-5-42-578" (wherein the value 42 is the domain identifier and the value 578 is the relative identifier), the replication logic 120 could modify the SID to be "S-1-5-42-430". Control continues at block 414.

In block 414, a "boot.ini" file is created on the destination iSCSI boot disk 106. With reference to the system 100, the replication logic 120 creates the "boot.ini" file on the destination iSCSI boot disk 106. Because multiple disks having multiple volumes thereon may be attached to the associated diskless iSCSI server 104, the "boot.ini" file includes the identification of the boot disk and the partition within the boot disk that includes the boot code and operating system from which the device is to boot. The replication logic 120 creates a "boot.ini" file that includes the identification of the boot disk and the partition on the destination iSCSI boot disk 106 that includes the boot code. Control continues at block 416.

In block 416, the registry copy 124 is loaded into the memory 126. With reference to the system 100, the replication logic 120 loads the registry copy 124 into the memory 126 from the destination iSCSI boot disk 106. As described above, the registry 122 cannot be copied and/or modified while the system on which the registry 122 is being utilized is executing. Accordingly, the registry copy 124 is loaded into the memory 126, which is a copy of the registry 122, thereby enabling the modification of a number of system parameters in the image of the registry that is loaded into the memory 126 from the destination iSCSI boot disk 106 (which is described in more detail below). Control continues at block 418.

In block 418, the system parameters in the registry copy 124 are modified. With reference to the system 100, the replication logic 120 modifies the system parameters in the registry copy 124. In one embodiment, the system parameters in the registry copy 124 that are modified include those parameters that are specific/related to the apparatus on which the registry is going to be used. For example, if the registry copy 124 is being modified for storage into the iSCSI boot disk 106, which is going to be used by the diskless iSCSI server 104A, the system parameters are modified to be specific/related to the diskless iSCSI server 104A. In an embodiment, the system parameters that are modified include the computer name and the host name for the associated diskless iSCSI server 104.

In one embodiment, a system parameter that is modified includes the IP address for the associated diskless iSCSI server 104. Another system parameter that may be modified includes the signature associated with the iSCSI boot disk 106. The signature for a disk is a unique identifier among the different disks (e.g., hard disks, diskettes, etc.) that are attached to the diskless iSCSI server 104. In an embodiment, the system parameters that are modified include the iSCSI boot driver order and the iSCSI boot driver for the associated diskless iSCSI server 104. The registry 122 is modified such that the value for the iSCSI driver is the first driver loaded in the SCSI miniport values in the GroupOrderList. A more detailed description of this modification is described in more detail in U.S. patent application entitled "Modified Operating System Boot Sequence for Diskless iSCSI Boot", Ser. No. 10/395,292, filed Mar. 24, 2003, to Edward A. Soltis and Charles Stevens Rissmeyer.

Additionally, internal to the registry copy 124 are other SIDs. Accordingly, as with the SIDs associated with files on the source disk 130, the SIDs, which are specific to the machine on which the registry resides and within the registry copy 124, are changed. Similar to the SIDs associated with files on the source disk 130, in an embodiment, the replication logic 120 replaces that portion of the SIDs that are specific to the machine with the same random number generated for use for modifying the SIDs associated with files (as described in block 412). Control continues at block 422.

In block 422, the remaining files from the source disk 130 are copied to the destination iSCSI boot disk 106. With reference to the system 100, the replication logic 120 copies the remaining files from the source disk 130 to the destination iSCSI boot disk 106. The remaining files will include all of the files stored in the source disk 130, exclusive of the files in the operating system directory and the registry 122 are copied to the destination iSCSI boot disk 106. Control continues at block 424.

In block 424, a page file is created for the destination iSCSI boot disk 106. With reference to the system 100, the replication logic 120 creates the page file for the destination boot disk 106. A page file is a file that is utilized by the operating system when pages are swapped into and out from the memory of the diskless server iSCSI server 104. In an embodiment, the size of this page file is set based on a parameter that is stored in the registry 122. The operations of the flow diagram 400 are complete for a given copy from the source disk 130 to an iSCSI boot disk 104.

Thus, a method, apparatus and system for different embodiments for boot disk replication for network booting of remote servers have been described. Although the present invention has been described with reference to specific exemplary embodiments, it will be evident that various modifications and changes may be made to these embodiments without departing from the broader spirit and scope of the invention. For example, while the operations of the flow diagram 400 are illustrated such that the replication logic 120 copies the data from the source disk 130 to one of the iSCSI boot disk 106, embodiments of the invention are not so limited. For example, in another embodiment, the replication logic 120 may copy the data from one iSCSI boot disk 106 to a different iSCSI boot disk 106. In an embodiment, the operations illustrated by the flow diagrams 300 and 400 can be performed in parallel across a number of iSCSI boot disks 106. For example for the operations illustrated in the flow diagram 400, the replication logic 120 can perform the operations illustrated in blocks 402–414 and 422–424 in parallel for each of a number of destination iSCSI boot disks 106. In an embodiment, the replication logic 120 performs the operations illustrated in blocks 416–420 one destination iSCSI boot disk 106 at a time, because of the limit on the size of the part of the memory 126 that can store the registry copy 124. In particular, for a given operating system, only a single copy of the registry may be loaded into the memory 126. In another embodiment, the size of the part of the memory 126 that is dedicated to storing the registry copy 124 may be increased, thereby allowing parallel operations for blocks 416–418. Accordingly, modifications to one copy of the registry are made based on one of the destination iSCSI boot disks 106. Therefore, the operations illustrated in blocks 416–418 are repeated for each of the number of destination iSCSI boot disks 106 to which the data is being copied. Therefore, the specification and drawings are to be regarded in an illustrative rather than a restrictive sense.

What is claimed is:

1. A method comprising:
    replicating data in a storage disk; and
    storing the data in an Internet Protocol Small Computer System Interface (iSCSI) boot disk that is associated with a diskless iSCSI server, wherein a part of the data, which is related to a device on which the data is executed, is updated with a value specific to the diskless iSCSI server during the storing of the data in the iSCSI boot disk.

2. The method of claim 1, wherein the data in the storage disk includes a number of files and wherein the part of the data, which is related to the device on which the data is executed, includes Security Identifiers associated with the number of files.

3. The method of claim 1, wherein the part of the data, which is related to the device on which the data is executed, includes an Internet Protocol (IP) address associated with the diskless iSCSI server.

4. The method of claim 3, wherein the part of the data, which is related to the device on which the data is executed, includes a name associated with the diskless iSCSI server.

5. The method of claim 4, wherein the storage disk is within a server, wherein the part of the data, which is related to the device on which the data is executed, is updated during the storing of the data in the iSCSI boot disk, wherein storing the data in the iSCSI boot disk includes,
loading a copy of a registry from the iSCSI boot disk into a memory of the server; and
changing values of variables in the registry that is loaded into the memory from an IP address and a name associated with the server to the IP address and the name associated with the diskless client.

6. A method comprising:
replicating files stored in a disk of a server, wherein the files have Security Identifiers (SIDs);
modifying values of the SIDs that are specific to the server;
loading at least one registry file of the files from the disk into a memory of the server;
changing, in the at least one registry file, values of variables for an Internet Protocol (IP) address and a name for the server to values of an IP address and a name for the diskless Internet Protocol Small Computer System Interface (iSCSI) server that is using an iSCSI boot disk during boot operations, respectively; and
storing the files in the iSCSI boot disk.

7. The method of claim 6 comprising changing, in the at least one registry file, values of variables for SIDs to values of SIDs for the diskless iSCSI server.

8. The method of claim 6 comprising changing, in the at least one registry file, a value of a signature from a value for the disk of the server to a value for the iSCSI boot disk.

9. The method of claim 6, comprising creating a boot initialization file within a first predetermined number of bytes of the iSCSI boot disk.

10. A method comprising:
copying files stored in a storage disk of a server to a number of boot disks that are used to boot a number of diskless servers; and
performing a loading operation, a modifying operation and a copying operation for each of the number of boot disks, wherein the loading operation includes loading a registry from the boot disk into a memory of the server, the modifying operation to include modifying at least one system parameter, which is specific to a device which uses the registry during execution, within the registry loaded into the memory; and wherein the copying operation includes copying the modified registry to the boot disk.

11. The method of claim 10, wherein the at least one system parameter, which is specific to the device which uses the registry during execution, includes the Internet Protocol address and name of the device.

12. The method of claim 10, comprising modifying Security Identifiers (SIDs) associated with files stored in the storage disk, for the SIDs that are specific to a device which utilizes the files during execution.

13. An apparatus comprising:
a storage disk operable to store a number of files including at least one registry file; and
a replication logic operable to replicate the number of files in the storage disk and to store the replicated number of files within an Internet Protocol Small Computer System Interface (iSCSI) boot disk that is associated with a diskless iSCSI server, wherein the replication logic is to change system parameters, which are stored in the at least one registry file and are specific to the apparatus, to values specific to the diskless iSCSI server as part of the storage of the replication number of files.

14. The apparatus of claim 13 comprising a memory operable to store the at least one registry file, wherein the replication logic is operable to replicate the at least one registry file and to store the replication of the at least one registry file in the memory.

15. The apparatus of claim 14, wherein the replication logic is operable to change, in the replication of the at least one registry file, values of variable for an Internet Protocol (IP) address and a name for the apparatus to values of an IP address and a name for the diskless iSCSI server, respectively.

16. A system comprising:
a storage disk operable to store a number of files including a registry to store parameters for the system;
a memory operable to store a copy of the registry; and
a processor operable to execute a replication logic, the replication logic to replicate the number of files in the storage disk and to store the files in an Internet Protocol Small Computer System Interface (iSCSI) boot disk that is associated with a diskless iSCSI server, wherein at least one parameter, which is specific to a device which utilizes the registry during execution, is updated as part of the store operation of the files in the iSCSI boot disk.

17. The system of claim 16, wherein the replication logic is to update Security Identifiers (SIDs), which are associated with the number of files, for the SIDs that are specific to a device which utilizes the files during execution.

18. The system of claim 16, wherein the at least one parameter, which is specific to the device which utilizes the registry during execution, includes an Internet Protocol address of the device.

19. The system of claim 16, wherein the at least one parameter, which is specific to the device which utilizes the registry during execution, includes a name of the device.

20. A machine-readable medium including a computer storage medium that provides instructions, which when executed by a machine, cause said machine to perform operations comprising:
replicating data in a storage disk; and
storing the data in an Internet Protocol Small Computer System Interface (iSCSI) boot disk that is associated with a diskless iSCSI server, wherein a part of the data, which is related to a device on which the data is executed, is updated with a value specific to the diskless iSCSI server during the storing of the data in the iSCSI boot disk.

21. The machine-readable medium of claim 20, wherein the data in the storage disk includes a number of files and wherein the part of the data, which is related to the device on which the data is executed, includes Security Identifiers associated with the number of files.

22. The machine-readable medium of claim 20, wherein the part of the data, which is related to the device on which the data is executed, includes an Internet Protocol (IP) address associated with the diskless iSCSI server.

23. The machine-readable medium of claim 22, wherein the part of the data, which is related to the device on which the data is executed, includes a name associated with the diskless iSCSI server.

24. The machine-readable medium of claim 23, wherein the storage disk is within a server, wherein the part of the data, which is related to the device on which the data is executed, is updated during the storing of the data in the iSCSI boot disk, wherein storing the data in the iSCSI boot disk includes, loading a copy of a registry from the iSCSI boot disk into a memory of the server; and changing values of variables in the registry that is loaded into the memory from an IP address and a name associated with the server to the IP address and the name associated with the diskless client.

25. A machine-readable medium including a computer storage medium that provides instructions, which when executed by a machine, cause said machine to perform operations comprising:

replicating files stored in a disk of a server, wherein the files have Security Identifiers (SIDs);

modifying values of the SIDs that are specific to the server;

loading at least one registry file of the files from the disk into a memory of the server;

changing, in the at least one registry file, values of variables for an Internet Protocol (IP) address and a name for the server to values of an IP address and a name for the diskless Internet Protocol Small Computer System Interface (iSCSI) server that is use an iSCSI boot disk during boot operations, respectively; and storing the files in the iSCSI boot disk.

26. The machine-readable medium of claim 25 wherein the operations further comprise changing, in the at least one registry file, values of variables for SIDs to values of SIDs for the diskless iSCSI server.

27. The machine-readable medium of claim 25 wherein the operations further comprise changing, in the at least one registry file, a value of a signature from a value for the disk of the server to a value for the iSCSI boot disk.

28. The machine-readable medium of claim 25 wherein the operations further comprise creating a boot initialization file within a first predetermined number of bytes of the iSCSI boot disk.

29. A machine-readable medium including a computer storage medium that provides instructions, which when executed by a machine, cause said machine to perform operations comprising:

copying files stored in a storage disk of a server to a number of boot disks that are used to boot a number of diskless servers; and performing a loading operation, a modifying operation and a copying operation for each of the number of boot disks, wherein the loading operation includes loading a registry from the boot disk into a memory of the server, the modifying operation to include modifying at least one system parameter, which is specific to a device which uses the registry during execution, within the registry loaded into the memory; and wherein the copying operation includes copying the modified registry to the boot disk.

30. The machine-readable medium of claim 29, wherein the at least one system parameter, which is specific to the device which uses the registry during execution, includes the Internet Protocol address and name of the device.

31. The machine-readable medium of claim 29, wherein the operations further comprise modifying Security Identifiers (SIDs) associated with files stored in the storage disk, for the SIDs that are specific to a device which utilizes the files during execution.

32. An apparatus comprising:

means for replicating data in a storage disk; and means for storing the data in an Internet Protocol Small Computer System Interface (iSCSI) boot disk that is associated with a diskless iSCSI server, wherein a part of the data, which is related to a device on which the data is executed, is updated with a value specific to the diskless iSCSI server during the storing of the data in the iSCSI boot disk.

33. The apparatus of claim 32, wherein the data in the storage disk includes a number of files and wherein the part of the data, which is related to the device on which the data is executed, includes Security Identifiers associated with the number of files.

34. The apparatus of claim 32, wherein the part of the data, which is related to the device on which the data is executed, includes an Internet Protocol (IP) address associated with the diskless iSCSI server.

35. An apparatus comprising:

means for replicating files stored in a disk of a server, wherein the files have Security Identifiers (SIDs);

means for modifying values of the SIDs that are specific to the server;

means for loading at least one registry file of the files from the disk into a memory of the server;

means for changing, in the at least one registry file, values of variables for an Internet Protocol (IP) address and a name for the server to values of an IP address and a name for the diskless Internet Protocol Small Computer System Interface (iSCSI) server that is to use an iSCSI boot disk during boot operations, respectively; and means for storing the files in the iSCSI boot disk.

36. The apparatus of claim 35 comprising means for changing, in the at least one registry file, values of variables for SIDs to values of SIDs for the diskless iSCSI server.

37. The apparatus of claim 35 comprising means for changing, in the at least one registry file, a value of a signature from a value for the disk of the server to a value for the iSCSI boot disk.

38. A system comprising:

means for copying files stored in a storage disk of a server to a number of boot disks that are used to boot a number of diskless servers; and means for performing a loading operation, a modifying operation and a copying operation for each of the number of boot disks, wherein the loading operation includes loading a registry from the boot disk into a memory of the server, the modifying operation to include modifying at least one system parameter, which is specific to a device which uses the registry during execution, within the registry loaded into the memory; and wherein the copying operation includes copying the modified registry to the boot disk.

39. The system of claim 38, wherein the at least one system parameter, which is specific to the device which uses the registry during execution, includes the Internet Protocol address and name of the device.

40. The system of claim 38, comprising means for modifying Security Identifiers (SIDs) associated with files stored in the storage disk, for the SIDs that are specific to a device which utilizes the files during execution.

* * * * *